Aug. 1, 1961 W. A. DUDLEY 2,994,335
FLOW VALVE DEVICES
Filed May 20, 1957 2 Sheets-Sheet 2
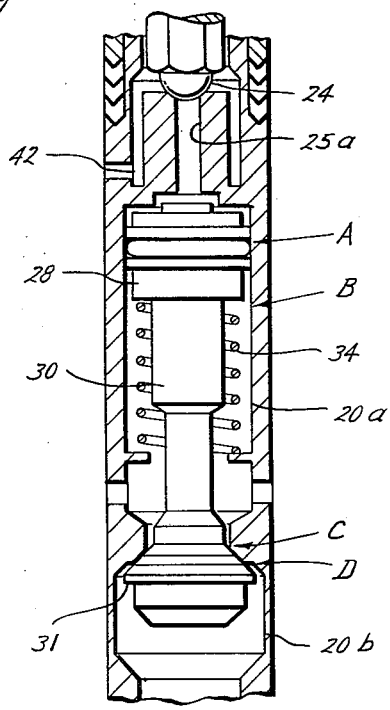
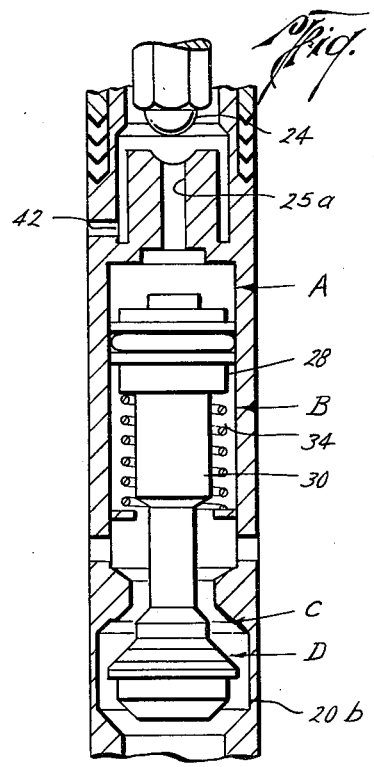
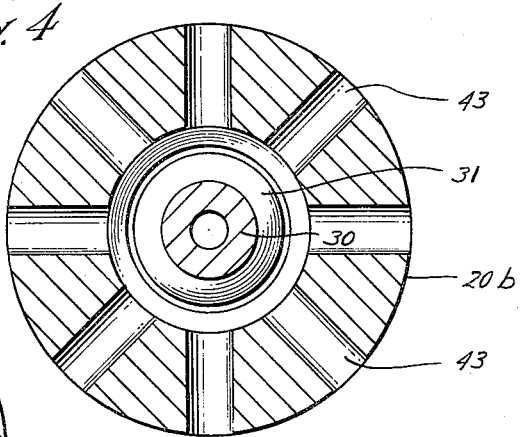
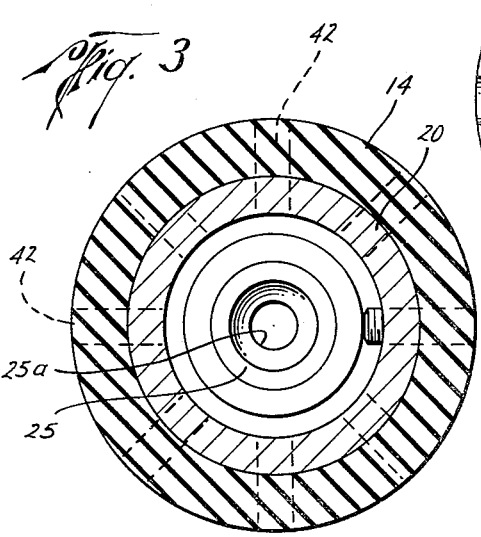
William A. Dudley
INVENTOR.
ATTORNEYS 2,994,335
Patented Aug. 1, 1961

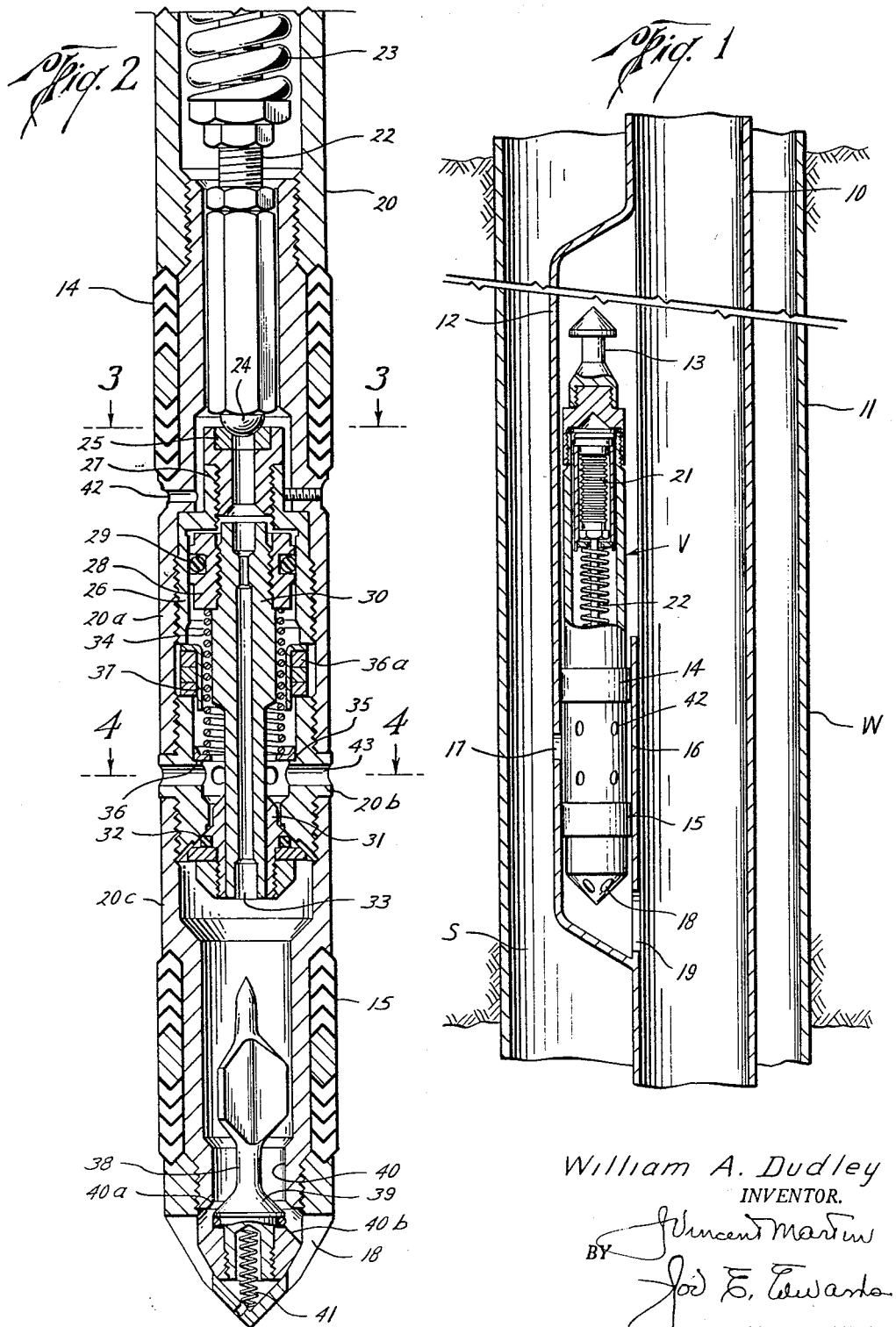

2,994,335
FLOW VALVE DEVICES
William A. Dudley, Dallas, Tex., assignor to Merla Tool Corporation, Dallas, Tex., a corporation of Texas
Filed May 20, 1957, Ser. No. 660,147
2 Claims. (Cl. 137—155)

This invention relates to new and useful improvements in flow valve devices.

One object of the invention is to provide an improved flow valve device for controlling the admission of a lifting fluid or gas into a well tubing or conductor, said device being of the intermitter type and being constructed so as to lend itself to wire line operation, whereby the device may be positioned within and removed from the well tubing by means of a wire line.

An important object of the invention is to provide an improved flow valve device having a main valve for controlling the admission of lifting fluid into a well conductor, together with an actuating piston for controlling movement of said valve; the device including means for balancing and unbalancing the forces acting upon the actuating piston so that the lifting gas pressure, which is acting upon the piston, may move said piston to open and close said valve in accordance with force conditions across said piston.

Another object is to provide a flow valve device having a main valve which is positively moved to open position by the pressure of the lifting gas and which is positively moved to closed position also by said lifting gas, whereby ample power to affect movement of the valve is assured.

Still another object is to provide a flow valve device, of the character described, wherein the balancing or unbalancing of forces across the actuating piston is controlled by a pilot valve, which valve is operated solely in accordance with the pressure of the lifting gas, whereby said lifting gas must be of a predetermined pressure in order to open said pilot valve and must fall to a predetermined pressure before the pilot valve closes; the opening and closing of the pilot valve controlling the operation of the main valve through said balancing and unbalancing of forces across the actuating piston.

A further object is to provide a valve device, of the character described, wherein the main valve and the pilot valve are actuated by pressure from a common source and also wherein the pressure, which actuates both valves, is discharged into a common area; the arrangement permitting a simplified, compact unit which lends itself to wire line operation.

Still another object is to provide a flow device wherein the main valve has direct connection with an actuating piston, with the areas of the piston and main valve being so arranged that the pressure of the lifting gas, the admission of which gas is controlled by a pilot valve, functions to open and close said main valve.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a view partly in section and partly in elevation and illustrating a flow valve device, constructed in accordance with the invention, mounted in a well tubing or well conductor.

FIGURE 2 is an enlarged vertical sectional view of the flow valve device, with the upper end of the device not shown, FIGURE 3 is a horizontal cross-sectional view, taken on the line 3—3 of FIGURE 2, FIGURE 4 is a horizontal cross-sectional view, taken on the line 4—4 of FIGURE 2, FIGURE 5 is a schematic view showing the main valve in a closed position, and FIGURE 6 is a view similar to FIGURE 5 illustrating the valve in an open position.

In the drawings the numeral 10 designates a well tubing or conductor which extends downwardly through a well casing 11 disposed within a well bore W. As illustrated, the tubing 10 is formed with a chamber or pocket 12 at one side therein for receiving the flow valve device which is generally indicated by the letter V. The device V is formed with the usual fishing neck 13 at its upper end, whereby a wire line may be connected to the device to lower the same into position or to remove the device from the tubing. The device is provided with an upper packing element 14 and a lower packing element 15, which are adapted to seal with the bore 16 of the pocket 12. A fluid inlet opening 17 is provided in the wall of the pocket or offset portion 12 to admit lifting gas, which is present within the casing 11, into the space between the packing elements 14 and 15. As will be explained, this lifting gas is controlled in its admission to the well tubing by the device V. The lower end of the flow valve device has openings 18 through which the lifting gas may pass into the lower portion of the pocket or offset and from this point said gas may enter the tubing string through a port 19. Upon entering the well tubing or conductor, the lifting gas will, of course, lift the well fluids, which may be present therein, upwardly to the surface in the usual well known manner.

The valve device V includes an outer housing 20, which is formed of several sections which are threaded or otherwise secured to each other. Within the upper portion of the housing is a pilot valve assembly which includes a bellows 21 having its upper end suitably secured within the housing and having its lower end connected to a pilot valve stem 22. A coil spring 23 surrounds the valve stem and exerts its pressure to constantly urge the valve stem in a downward direction which would tend to maintain the bellows 21 in its expanded position. The lower end of the stem 22 carries a pilot valve 24 and such valve is adapted to engage an annular seat 25. The spring 23 has a predetermined pressure and, as will be explained, lifting gas pressure is introduced into the upper end of the casing or housing 20 and acts upon the bellows 21 to collapse the same, overcoming the tension of spring 23 to unseat the pilot valve. Whenever the pressure within the upper portion of the housing is less than the force exerted by the spring 23, the pilot valve is seated. As shown in FIGURE 2, the pilot valve 24 and its seat 25 are substantially opposite the upper packing element 14, which is mounted on the exterior of the device and which seals with the bore of the pocket or offset portion 12.

Below the pilot valve 24 is an intermediate housing section 20a, an inlet thimble section 20b and a lower section 20c. Within the section 20a, an annular cylinder 26 is disposed. The upper end of the cylinder 26 is reduced as indicated at 27 and it attached to and carries the pilot valve seat 25. A piston 28 is slidable within the bore of the cylinder 26 and may be provided with an O-ring seal ring 29 for sealing between the piston and the bore of the cylinder. The piston 28 is carried by a tubular main valve stem 30, which extends downwardly through the intermediate section 20a and section 20b of the housing. The lower end of the valve stem carries a main valve 31, which is upwardly seating against an annular seat 32 formed within the lower end of the housing section 20b. The valve stem 30 is formed with an axial restricted bore 33 which extends entirely through the stem.

A coil spring 34 surrounds the valve stem and has its upper end engaging the piston 28 with its lower end supported upon a retaining washer 35 which rests upon an internal shoulder 36 provided within the upper portion of the section 20b. The spring 34 constantly exerts its pressure to urge the piston 28 upwardly within its cylinder 26 and since the main valve 31 is secured to the lower end of the valve stem, this spring also acts to urge the main valve to a seated position in the manner shown in FIGURE 2. Upward movement of the piston 28 is, of course, limited by the main valve 31 engaging its seat, while downward movement of the piston is restricted by a resilient bumper assembly 36a. This assembly comprises a plurality of elastic packing rings which are mounted on an annular retainer sleeve 37.

The lower packing element 15 is suitably mounted on the exterior of the lower housing section 20c. The openings 18, which conduct fluid to the interior of section 20c, are provided in the lower end of said section and an upwardly seating check valve 38 is mounted within the bore thereof. The check valve 38 includes a valve member 39 having an O-ring seal thereon arranged to seal with the bore 40 of the lower portion of the section 20c to prevent a back-flow through the device. A stop shoulder 40a is enageable by an external annular projection 40b on the valve member to limit upward movement of said member. A light coil spring 41 supports the check valve in a predetermined open position relative to bore 40, whereby the valve is made more sensitive to back flow.

The lifting gas or fluid, which is to be introduced into the well tubing or conductor 10, is normally present in the annular space S between the tubing 10 and the well casing 11. This lifting gas is introduced into the annular space at the upper end thereof and its pressure is usually controlled from the surface. The lifting gas pressure may enter the upper end of the housing 20 so as to act upon the bellows 21 through inlet ports 42 which are formed in the intermediate section 20a of the housing just below the packing element 14. This pressure, after passing through the ports 42, passes around the valve seat 25, then upwardly past the pilot valve 24 and into the interior of the housing in the area surrounding the spring 23 and bellows 21. The lifting gas may also enter the interior of the intermediate section 20a below the piston 28 through a plurality of radial ports 43 which are provided at the lower end of the section 20a (FIGURE 2). It will be noted that the ports 43 are located above the lower packing element 15. Thus, the lifting gas pressure entering ports or openings 17 in the pocket or offset portion 12, enters the space between the packing elements 14 and 15 and may then flow through the ports 42 to act on the bellows in the manner described, and may also flow through the ports 43 to act on the under side of the piston 28. Also, this pressure may act upon the upper surface of the main valve 31.

The tubing pressure, that is, the pressure, which is present within the well tubing or conductor 10 may enter the openings 18 in the lower end of the section 20c and will act against the under side of the main valve 31. Because the valve stem has a bore 33 extending entirely therethrough, this tubing pressure may also flow upwardly and act upon the upper surface of the piston 28. Thus, with the parts in the position shown in FIGURE 2, casing pressure will be present within the upper portion of the housing acting on the bellows 21 and will be present in the sections 20a and 20b of the housing acting on the lower end of the piston 28 and the upper surface of the main valve. Tubing pressure may be acting on the lower end of the valve 31 and also upon the upper end of the piston 28 through the bore 33.

In the operation of the device, reference is made to FIGURES 5 and 6 which schematically illustrate the piston and main valve and show its relationship to the pilot valve 24. The effective area of the upper surface of the piston 28 as indicated at A in FIGURE 5, while the effective area of the under side of the piston is indicated at B. The area on the upper end of the main valve 31, which is acted upon by the casing pressure within the sections 20a and 20b of the housing, is designated C in FIGURE 5, while the lower effective area of said valve is indicated at D. As explained, the casing pressure is present within the interior of the housing sections 20a and 20b and is, therefore, acting upwardly against the area B of the under side of the piston and is acting downwardly on the upper surface or effective area C of the main valve 31. Since the area B is greater than the area C, the effect of this pressure would be to urge the piston in an upward direction. This action is assisted by the force of the spring 34 which is also acting upwardly on the piston.

Casing pressure is also entering through ports 42 upwardly around the pilot valve 24 and against the exterior of the pilot bellows 21. With the check valve 38 in the lower end of the device (not shown in FIGURE 5) in its lower or open position, the tubing pressure is acting against the effective area D of the main valve 31 and upwardly through the central bore 33 of the valve stem and against the upper effective area A of the piston 28. The area A is a larger effective area than the area D and thus the effect of the tubing pressure is to urge the piston in a downward direction which would be toward a position unseating the main valve. However, in normal operation, the casing pressure and spring are sufficient to hold the main valve closed.

In describing the operation of the valve, it will be assumed that the valve 31 will close when there is 500 p.s.i. pressure in the casing or annulus S and that the valve will open when this pressure is built up to 550 p.s.i. With the valve in closed position as shown in FIGURE 5, the casing pressure is built up to 550 p.s.i. When this occurs, the force of the pilot spring 23, which is holding the pilot valve 24 seated, is overcome and the pilot is moved off of its seat 25. Unseating of the pilot valve 24 permits the 550 p.s.i. casing pressure to pass downwardly through the bore 25a of the pilot valve seat and into the area above the piston 28, this pressure acting upon the area A. As explained, the same casing pressure was present in the interior of the sections 20a and 20b acting upwardly against area B of the piston and downwardly on area C of the main valve. As the pressure above the piston acting on area A balances the force which is acting on area B on the lower side of the piston, the full casing pressure acting upon the effective area C of the main valve 31 moves said main valve downwardly to an unseated position as shown in FIGURE 6.

When this occurs, the casing pressure may flow past the valve 31, outwardly through the lower discharge ports 18 of the device and then through the opening 19 into the well tubing to lift the well fluids therein. As the pressure flows into the well tubing, there is a reduction in the casing pressure and as this pressure falls to 500 p.s.i., the spring 23 acting on the pilot valve 24 moves the pilot valve to its seated position thereby closing off communication between the source of the casing pressure and the upper end of the piston 28. Thereafter, the pressure, which has been acting on the area A, is permitted to escape through the restricted bore 33 of the main valve stem and to pass outwardly with the lifting gas and into the well tubing. The escape of pressure from above the piston A reduces the pressure acting on area A and when the force of this pressure is less than the force of the pressure within the section 20a acting on the lower end of the piston, the piston is moved upwardly to again seat the main valve. The parts will then remain in this position until the casing pressure is again built up in order to unseat the pilot valve in the manner heretofore described.

From the foregoing, it is obvious that the casing pressure is introduced into the intermediate and thimble sections 20a and 20b of the housing and is at all times acting upwardly upon the piston 28 and downwardly upon the area C of the main valve 31. By opening and closing the pilot valve 24, a balance or unbalance of forces acting upon the piston 28 is effected and it is this balance or unbalance which results in movement of the main valve. In the case where the pilot valve is open and pressure is admitted to the area above the piston 28, the reaching of a balanced condition causes the casing pressure acting on the area C of the main valve to move said valve open. When the pilot valve is closed and pressure is permitted to bleed off from the area above the piston, the forces across the piston are again unbalanced and the casing pressure within the intermediate section 20a of the housing acts against the under side of the piston or the area B to move the piston upwardly. This is permitted because the area B of the piston is larger than the effective area C of the main valve which would resist the closing movement. The opening and closing of the main valve is accomplished solely by the casing pressure which acts upon the different cross-sectional area.

It is pointed out that the supply of pressure, which operates the bellows, is the same as that which is introduced into the sections 20a and 20b to effect operation of the main valve. This same pressure is the lifting gas which is ultimately introduced into the well tubing. It is noted that the gas, which actuates the pilot valve and which enters the area above the piston 28, is finally discharged through the bore 33 of the valve stem and is also directed to the well tubing. The device is relatively simple in construction and is extremely compact so that it may be made of a sufficiently small diameter to lend itself to wire line operation. Although the device has been shown as lowered into and removed from the tubing string on a wire line by locating said device in an offset portion or pocket 12, the invention is not to be limited to a wire line valve for obviously the valve would function just as efficiently if it were mounted in an offset portion in the tubing string as a part of the string. The particular construction of the piston 28 and the valve 31 are, of course, subject to variation although the present construction makes it possible to use a single seal ring to effect the proper sealing action. The packing elements 14 and 15 on the exterior of the housing have been shown as chevron type packing but obviously any suitable means may be provided.

The foregoing disclosure and description of the invention is illustrative and explnaatory thereof and various changes in the size, shape and materials, as well as in the details of the illustrated construction, may be made within the scope of the appended claims without departing from the spirit of the invention.

What I claim is:

1. A gas lift valve comprising, a tubular housing having an outlet at one end, main gas and pilot gas inlets in an intermediate section of said housing and spaced from said outlet, seal means on the housing and spaced from the main and pilot gas inlets toward the other end of the housing, seal means on the housing between said outlet and inlets, a flow passageway in the housing connecting the main gas inlet and the outlet, a valve seat in said passageway, a main valve member cooperable with the valve seat to control flow through the passageway, a pressure responsive member in the housing spaced from the main gas inlet toward the other end of the housing and connected to said main valve member, means establishing fluid communication between one side of the pressure responsive member and the main gas inlet, means including a bleed passageway establishing communication between the other side of the pressure responsive member and said outlet, means including a pilot valve seat spaced from the pressure responsive member toward the other end of the housing establishing communication between said other side of the pressure responsive member and the pilot gas inlet, a pilot valve member cooperable with said pilot valve seat controlling flow of pilot gas to the other side of the pressure responsive member, bellows means spaced from said pressure responsive member and pilot valve seat toward said other end of the housing and connected to said pilot valve member, and means conducting fluid from said pilot gas inlet to said bellows to operate said bellows means in response to change in pressure at said pilot gas inlet, said pilot valve and bellows so arranged that upon an increase in pilot pressure to a selected value the pilot valve member moves to open position, said main valve member and pressure responsive member so arranged that when the pilot valve member is in seated position the main valve member is in seated position and when the pilot valve member is in non-seated position the main valve member is in non-seated position.

2. A gas lift valve comprising, a tubular housing having an outlet at its lower end, main gas and pilot gas inlets spaced upwardly from said outlet, seal means on the housing above the main and pilot gas inlets, seal means on the housing above the outlet and below the main and pilot gas inlets, a flow passageway in the housing connecting the main gas inlet and the outlet, a valve seat in said passageway, a main valve member cooperable with the valve seat to control flow through the passageway, a cylinder in the housing above the main gas inlet, a piston sealingly engaging said cylinder and connected to said valve member, means establishing fluid communication between one side of the piston and the main gas inlet, means including a bleed passageway establishing communication between the other side of the piston and said outlet, means including a pilot valve seat above the cylinder establishing communication between said other side of the piston and the pilot gas inlet, a pilot valve member cooperable with said pilot valve seat controlling flow of pilot gas to said other side of the piston, bellows means above said cylinder and pilot valve seat and connected to said pilot valve, and means conducting fluid from said pilot gas inlet to said bellows to operate said bellows means in response to change in pressure at said pilot gas inlet, said pilot valve and bellows so arranged that upon an increase in pilot pressure to a selected value the pilot valve member moves to open position, said main valve member and piston so arranged that when the pilot valve member is in seated position the main valve member is in seated position and when the pilot valve member is in non-seated position the main valve member is in non-seated position.

References Cited in the file of this patent

UNITED STATES PATENTS

| 1,724,855 | Small | Aug. 13, 1929 |
| 2,446,680 | Walton | Aug. 10, 1948 |
| 2,573,110 | Robison | Oct. 30, 1951 |
| 2,744,538 | Stevenson | May 8, 1956 |